May 7, 1957 S. H. M. DODINGTON 2,791,690

FREQUENCY DISCRIMINATOR CIRCUIT

Filed June 3, 1955

INVENTOR
SVEN H. M. DODINGTON
BY Philip M. Bolton
ATTORNEY 2,791,690
Patented May 7, 1957

2,791,690

FREQUENCY DISCRIMINATOR CIRCUIT

Sven H. M. Dodington, Nutley, N. J., assignor to International Telephone and Telegraph Corporation, Nutley, N. J., a corporation of Maryland Application June 3, 1955, Serial No. 512,974

4 Claims. (Cl. 250—27)

Figure 2:
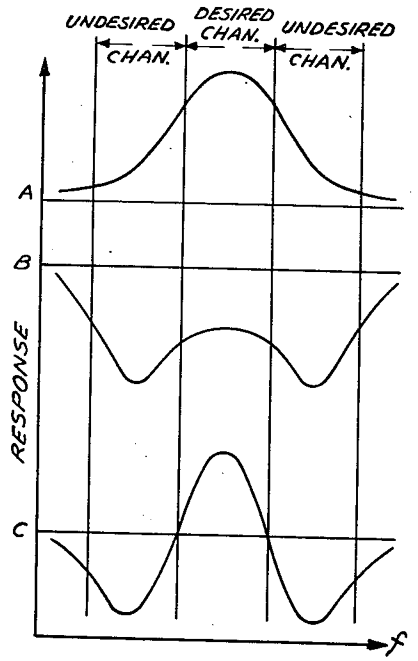

This invention relates to frequency discriminators, particularly those serving as narrow band pass filters in pulsed systems.

In order to improve the selectivity of receivers in pulse systems, it has heretofore been proposed to use the so-called Ferris discriminator (see Electrical Communication 1949, "Crystal Control at 1000 Megacycles for Aerial Navigation"). The conventional Ferris discriminator was designed to prevent reception of wide spectrum pulses unless their center frequency is exactly on the desired channel. It is used in systems for detection of short pulses of electromagnetic wave energy where there are a large number of communication channels spaced so closely in frequency that the spectrum of a communicating pulse extends over a bandwidth greater than the channel spacing. In such situations the use of a very narrow band intermediate frequency (I. F.) amplifier becomes insufficient to insure suppression of reception of signals radiated on adjacent channels because part of the adjacent channel pulsed energy overlaps the frequency spectrum of the desired channel and thus is detected, amplified and received. On the other hand, when the Ferris discriminator circuit is utilized, it is preceded by an I. F. amplifier which has a bandwidth which is broad enough to pass several channels, for example, the desired channel and the two adjacent ones. The Ferris discriminator circuit provides a pulse of one polarity if the greater part of the pulse spectrum energy is located within the desired channel and a pulse of the opposite polarity if the greater part of the pulse spectrum energy is located without the desired channel. A following threshold clipper circuit rejects the pulse of opposite polarity. Hence the Ferris discriminator circuit insures the rejection of adjacent channels by inversion of the pulse output polarity. Very effective rejection is obtained by this method. However, adjacent-channel signals, comparable in magnitude to desired channel signals, may wipe out the latter if they coincide in time. This time coincidence is most likely to occur, of course, if the duty cycle of either the wanted or unwanted signals is high. Furthermore the noise power is almost tripled which is particularly bothersome when the incoming signals are weak.

An object of the present invention is the provision of an improved frequency discriminator serving as a narrow band pass filter in which adjacent-channel pulses, comparable in magnitude to desired channel signals, and even substantially greater, will not wipe out the desired-channel signals.

Another object of the present invention is the provision of an improved frequency discriminator in which the noise power is kept lower than in the usual Ferris discriminator circuit on weak signals.

In accordance with one feature of the present invention, there is provided a frequency discriminator which is less sensitive to off-channel voltages than it is to on-channel voltages so that off-channel pulses coinciding with on-channel pulses will not wipe out the latter unless the off-channel pulses are very much greater.

In accordance with another feature of the present invention, I provide a circuit which operates as an ordinary detector with weak input signals, and operates as a Ferris discriminator with strong input signals, whereby when operating as a conventional detector the noise level is kept low.

Figure 3:
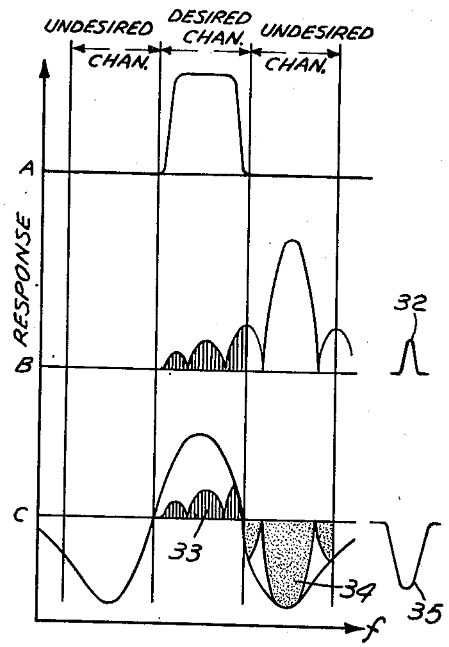
Figure 4:
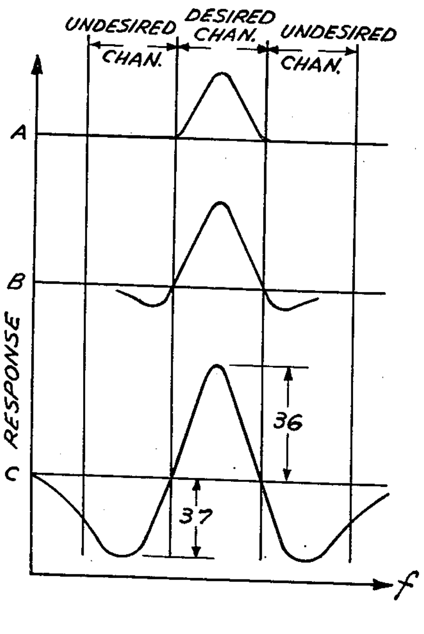
Figure 1:
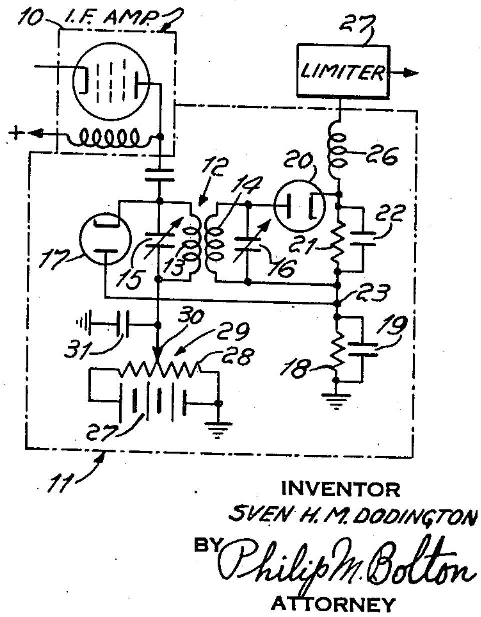

Other and further objects of the present invention will become apparent, and the foregoing will be better understood with reference to the following description of embodiments thereof, reference being had to the drawings, in which:

Fig. 1 is a schematic and block diagram of a circuit arrangement adapted to operate as both a conventional detector arrangement and a Ferris discriminator; and Figs. 2, 3 and 4 are sets of curves used in describing the background and operation of the present invention.

The present invention makes use of the fact that, in practice, commonly encountered pulses do not have infinitely steep rise and decay times and, therefore, do actually have less than an infinitely wide spectrum. In receiving such pulses, therefore, in accordance with the present invention, I do not provide as much sensitivity to off-channel signals as I do to on-channel signals. This is accomplished in the present invention by adding bias to the diode which produces the off-channel voltage in a conventional Ferris discriminator so that it is less sensitive and so that this voltage does not appear in the output unless it exceeds a given magnitude. Thus, the signal of the desired channel is only wiped out when the adjacent channel signal is many times stronger than the desired channel signal. For example, if the pulses being handled have a spectrum which is down 20 db. in the adjacent channel, the bias is set so that the off-channel signals must be 20 db. stronger than the on-channel signals before such wiping out occurs. Furthermore for weak input signals this diode is blocked by the bias and the circuit operates as an ordinary detector with a low noise characteristic. However, when the input signal is strong, this bias is overcome and Ferris-type action occurs.

The foregoing will be detailed in the following description, reference being had to the drawings. Referring now to Fig. 1, the output from an intermediate frequency amplifier 10 having a band pass characteristic of at least three times that of the desired channel is used to feed a generally Ferris-type circuit 11. The circuit 11 consists of a transformer 12 having a primary coil 13 tightly coupled to a secondary coil 14 with said coils being respectively tuned by variable condensers 15 and 16 to the desired center frequency of the selected band. The coupling between the primary coil 13 and secondary 14 preferably approaches critical coupling and there is a high ratio of secondary to primary Q, preferably equal to approximately 3. The voltage across the primary tuned coil 13 is fed via a suitably poled rectifier, diode 17, to a load resistor 18 shunted by a capacitor 19. The voltage across the secondary tuned coil 14 is rectified in a similar rectifier 20 and passed through a load resistor 21 shunted by a capacitor 22. Resistors 18 and 21 are connected together at one end of each at a junction point 23. The diodes 17 and 20 are oppositely poled so that the potentials developed across resistors 18 and 21 oppose each other. Thus, the free end 24 of resistor 21 is connected to the cathode of diode 20 while the junction point 23 or opposite end of resistor 21 is connected to the anode of diode 17. The opposite end 25 of resistor 18 is connected to ground. The output which consists of the algebraic sum of the potentials across resistors 21 and 18, respectively, is taken from a point at the cathode of diode 20 through an I. F. choke 26 and fed as a video (pulse) output to a threshold device, such as a limiter 27, which only permits a certain portion of the positive peak voltages to mass to the next stage. This threshold level is adjusted to produce desired optimum of off-channel rejection and on-channel signal passing.

In accordance with the present invention, the diode 17 is biased so that it is cut off at weak signals, as will be more fully explained hereinafter. For this purpose there may be provided a bias source 27 connected across the resistor 28 of a potentiometer 29 whose movable arm 30 is adjusted to obtain the precise bias required. The negative end of source 27 may be coupled to ground, and a suitable bypass condenser 31 shunts the I. F. directly to ground bypassing the potentiometer and bias voltage source.

Assuming that the bias is initially adjusted so that the arrangement operates as a Ferris discriminator, the steady state response shown in Fig. 2 is obtained. Fig. 2 shows three curves 2A, 2B and 2C, in each of which "Respones," is plotted along the ordinate against "Frequency" along the abscissa. As the intermediate frequency is varied, the response which will appear as voltage developed across secondary coil 14 will vary as shown in curve 2A a maximum being obtained for the desired channel, with broad sweeping skirts of the characteristic extending into the adjacent channels. The resulting unidirectional voltage obtained across resistor 21 will be positive in direction. As the intermediate frequency is varied, the voltage developed across primary coil 13 will vary as indicated in curve 2B with two peaks being encountered in the adjacent channels and a dip in the desired channel, the resulting unidirectional voltage obtained across resistor 18 being negative in direction. When the characteristics of these two curves are combined, a characteristic such as shown in curve 2C is produced wherein a maximum positive response is obtained for signals in the center of the desired channel while the maximum negative response is obtained for signals near the center of the adjacent channels.

In further analyzing the conventional Ferris discriminator operation, it will be seen that even if we provided a receiver having an ideal selectivity curve such as depicted in Fig. 3A, a pulse appearing in the undesired channel as indicated in 3B will have a spectrum such that a substantial part of the signal appears in the desired channel, even though the pulse is centered in the adjacent channels. Thus, we will get a small spurious positive output pulse 32 from such a selectivity characteristic, as shown in Fig. 3A. However, using the characteristic of a Ferris discriminator depicted in Fig. 2C, we will obtain positive and negative voltages proportional to the energy contents depicted at 33 and 34 in Fig. 3C, which will produce a net negative pulse output 35 which will not pass the threshold of limiter 27 and, therefore, will produce no spurious output signal. Such a conventional system, however, produces noise approximately three times that of the conventional receiver (4½ decibels). This is particularly objectionable where we have weak signals. It will be seen, however, that by using a curve similar to 3A for weak signals, and by making use of the Ferris action for strong signals, a decided improvement will be obtained. Furthermore, by rendering the circuit less sensitive to off-channel voltages, off-channel pulses which coincide with on-channel pulses will generally be prevented from knocking out the on-channel pulse. Referring now to the curves of Fig. 4, which represent the desired action, the bias of diode 17 is properly set so that for weak signals diode 17 is blocked and a characteristic such as shown in Fig. 4A will be obtained. With medium strength signals the bias of diode 17 will be somewhat overcome, and the resultant characteristic will be similar to that represented in Fig. 4B. With strong signals, Ferris-type curves and Ferris-type discriminator action such as represented in Fig. 4C will be obtained. It is to be noted that the response or sensitiivty for on-channel signals is greater, as indicated by line 36, than for off-channel signals, such as indicated by line 37. This difference prevents knocking out of channel pulses by coincidence of pulses appearing in adjacent channels unless such pulses are considerably greater than the on-channel pulses.This relation is controlled by the adjustment of the bias potentiometer 29.

While I have described my invention above with reference to specific embodiments, it is to be understood that the invention is to be interpreted according to the state of the prior art and the appended claims.

I claim:

1. A narrow band pass circuit for a given frequency band comprising a first tuned circuit and a second tuned circuit, said second tuned circuit producing a maximum response in said given frequency band, said first tuned circuit producing its maximum response outside and adjacent said given frequency band, means coupled to said first tuned circuit for developing a first unidirectional potential, means coupled to said second tuned circuit for developing a second unidirectional voltage having a polarity opposed to said first unidirectional voltage, means for applying a biasing voltage to said means for developing a first unidirectional potential to block operation thereof for signal voltages developed across said first tuned circuit below a predetermined amplitude level and means responsive to said unidirectional voltages to produce an output representative of the difference between said unidirectional voltages.

2. A narrow band pass circuit for a given frequency band comprising a first tuned circuit and a second tuned circuit, both tuned to said given frequency band, said second tuned circuit having a response characteristic with a maximum in said given frequency band sloping down to substantially minimum response outside said given frequency band, said first tuned circuit having a response characteristic with maximums on both sides of said center frequency outside and adjacent said given frequency band with a dip between said maximums inside said given frequency band, a first detector means coupled to said first tuned circuit for developing a first unidirectional potential principally representative of the response of said first tuned circuit to input signal energy in adjacent frequency bands, a second detector means coupled to said second tuned circuit for developing a second unidirectional voltage having a polarity opposed to said first unidirectional voltage and principally representative of the response of said tuned circuit to input signal energy in said given frequency band, means for applying a biasing voltage to said first detector means to block operation thereof for signal voltages developed across said first tuned circuit below a predetermined amplitude level and for lowering the unidirectional voltages developed by it for such signal voltages above said level, and means responsive to said unidirectional voltages to produce an output representative of the difference between said unidirectional voltages.

3. A narrow band pass circuit for a given frequency band comprising a transformer having a tuned primary and a tuned secondary, said primary and secondary being tightly coupled with a high ratio of secondary to primary circuit Q, said primary having a response curve with maximums on the sides of said frequency band in adjacent frequency bands, said secondary having a response characteristic with a maximum in the center of said given frequency band with minimum response outside said band, a first rectifier coupled to said primary for producing a first unidirectional potential in response to input signals, a second rectifier coupled to said secondary for producing a second unidirectional voltage, in response to input signals, having a polarity opposed to said first unidirectional voltage, means for applying a biasing voltage to said first rectifier to block operation thereof for signal voltages developed across said primary below a predetermined amplitude level and for lowering said first unidirectional voltage for such signal voltages above said level, and means responsive to said unidirectional voltages to produce an output representative of the difference between said opposed unidirectional voltages.

4. A narrow band pass circuit according to claim 3, further including a load resistor connected in series with said first rectifier, a second load resistor connected in series with said second rectifier, said resistors being connected in series with each other, and a pair of condensers, each condenser being in shunt with one of said resistors.

References Cited in the file of this patent

UNITED STATES PATENTS

| | | |
|---|---|---|
| 2,231,371 | Roberts | Jan. 4, 1939 |
| 2,233,339 | Brown | Feb. 25, 1941 |
| 2,256,063 | Tellegen et al. | Sept. 16, 1941 |

OTHER REFERENCES

Publication: Electrical Communication, 1949, vol. 26, Int. Tel. and Tel. Inc., page 275.